Figure 7:
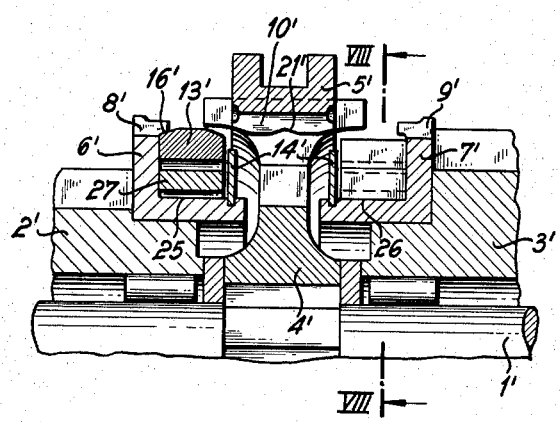

Aug. 17, 1965
H. REICH
3,200,920
SYNCHRONIZATION ARRANGEMENT FOR
CHANGE-SPEED TRANSMISSIONS
Filed Feb. 1, 1963
2 Sheets-Sheet 1
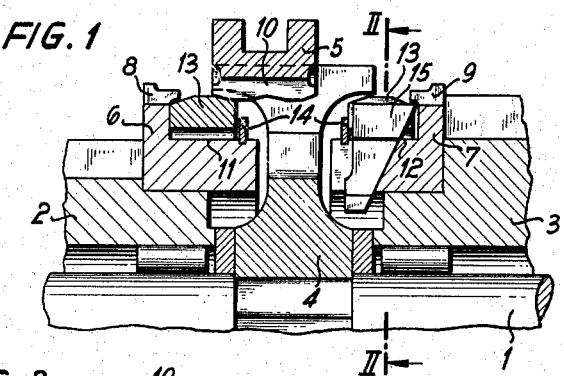
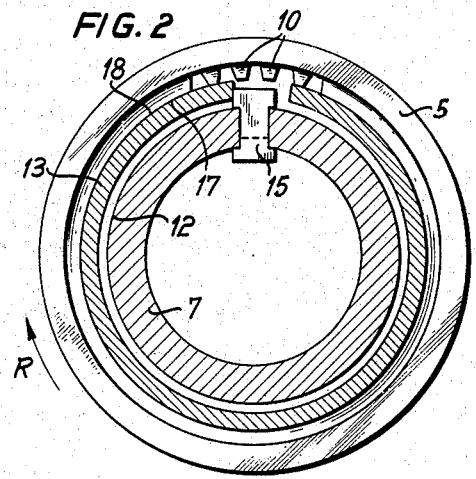
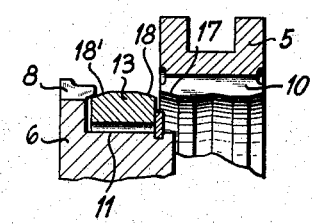
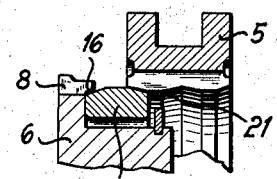
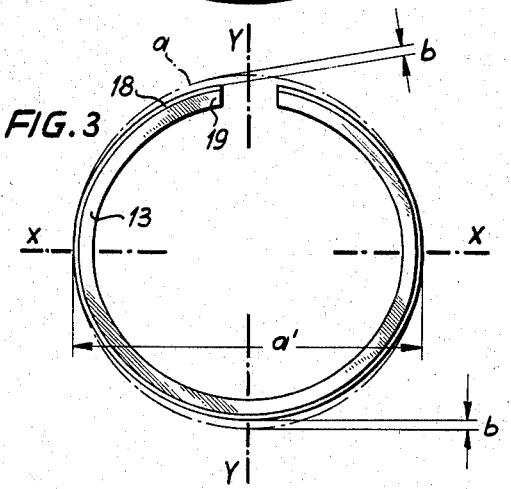
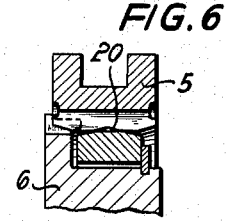
INVENTOR:
Hans REICH
BY: Dicke & Craig
ATTORNEYS Aug. 17, 1965

H. REICH 3,200,920

SYNCHRONIZATION ARRANGEMENT FOR
CHANGE-SPEED TRANSMISSIONS

Filed Feb. 1, 1963

2 Sheets-Sheet 2

INVENTOR:
Hans REICH

BY: Dicke & Craig

ATTORNEYS 3,200,920
SYNCHRONIZATION ARRANGEMENT FOR
CHANGE-SPEED TRANSMISSIONS
Hans Reich, Korntal, near Stuttgart, Germany, assignor to
Firma Dr. Ing. h.c. F. Porsche K.G., Stuttgart-Zuffenhausen, Germany
Filed Feb. 1, 1963, Ser. No. 255,471
Claims priority, application Germany, Feb. 21, 1962,
P 28,830
7 Claims. (Cl. 192—53)

The present invention relates to a synchronization arrangement for change-speed transmissions, especially for motor vehicles, in which the synchronizing body consists of a slotted springy ring which is retained under initial or pre-stress in a coupling member operatively associated with or coordinated to the shifting sleeve and possesses at least one friction surface which, brought into engagement with the working surfaces of the shifting sleeve, effects synchronization.

With synchronization installations of this type the engagement of a speed in the change-speed transmission is effected by displacement of the shifting sleeve from the center position thereof up to the abutment at the teeth of the coupling member coordinated thereto. During that time the synchronizing ring retained under initial or pre-stress in the coupling member is brought into frictional engagement with the shifting sleeve whereby the rotational speed difference between the shaft and the gear wheel to be engaged is equalized. When in the known prior art constructions the synchronization ring is compressed in this manner, there act along the circumference of the synchronizing ring pressure forces of different magnitudes at the leading and trailing ends as well as in the ring center with respect to the ends of the ring whereby an uneven wear takes place at the friction surfaces thereof. This may be attributed essentially to the fact that a synchronizing ring is used in the synchronization installations of the prior art which has in the unstressed condition thereof a cylindrical shape whereby, in order to attain the desired initial stress, the diameter thereof is larger than the diameter of the centering surface thereof within the coupling body. As a result thereof, a non-concentric compression is imparted to the synchronizing ring so that the synchronizing ring assumes in the working position thereof an ellipse-like shape with correspondingly differing pressure force distribution.

In order to avoid these shortcomings, it has already been proposed heretofore to provide a synchronizing ring of differing profiled cross section which possesses its greatest wall thickness at the place of the largest bending moment and which decreases continuously or tapers off from that point toward the ends of the ring. Synchronizing rings constructed in this manner produce a satisfactory wear picture, however, such rings are difficult to manufacture; in order to enable use of synchronizing rings of uniform wall strength, it has been further proposed heretofore to construct the blocking parts of the synchronization installation or arrange the same distributed along the circumference of the synchronizing ring in such a manner that an approximately uniform loading of the ring is achieved over the entire circumference therof. While a desired even distribution of the pressure forces is achieved within the region opposite to the ring ends by the use of such a construction, this is, however, not the case within the region of the leading and trailing ends of the ring which are subjected as a result thereof to an increased wear. The synchronizing rings of such prior art construction have therefore, to be exchanged even though a sufficiently strong wear layer is still present over a large area thereof. Furthermore, there is known in the prior art a slotted synchronizing ring two circumferential surfaces inclined at an angle with respect to each other whereby the one surface serves for purposes of centering of the ring within the coupling body whereas the other surface is coordinated as friction surface to the shifting sleeve. The centering surface of the synchronizing ring, cylindrical in the unstressed condition, is machined into oval shape with the largest circumference in the plane of the ends of the ring and is inserted under initial stress in the coupling body in such a manner that the friction surface of the synchronizing ring comes to lie, in the neutral position of the shifting sleeve, concentrically to the working surface of the shifting sleeve coordinated thereto. The disadvantages of such a construction essentially consists in the fact that the synchronizing ring which during the initial phase of the synchronization operation at first abuts nearly over the entire circumference thereof against the friction counter surface, is deformed asymmetrically by the continuing compression during the shifting operation and therefore exhibits in the position in which the synchronization work, properly speaking, takes place, a considerably higher specific compression than is the other areas of the circumference thereof, especially at the ends of the ring. Added thereto is the fact that such synchronizing rings cannot be inserted in any desired manner into the synchronization installation but care must be taken that the superficially considered identical, circumferential surfaces are mounted in the proper sequence.

According to the present invention, these disadvantages are avoided in that the synchronizing ring having the same section over the entire circumference thereof is constructed in the unstressed condition thereof of oval shape with the largest dimension in a plane which extends essentially perpendicularly to the axial plane through the ends of the ring. As a result of such a shape of the unstressed ring, there is achieved, without having to accept disadvantageous consequences in the remainder of the positions of the synchronizing ring, that the synchronizing ring in the working position thereof, that is, during the synchronizing work, abuts over the entire circumference thereof flush against the shifting sleeve under formation of a cylindrical outer shape so that an even wear of the friction layer results therefrom. Simultaneously therewith, the shifting forces for carrying out the change of speed or transmission ratios are reduced as a result thereof and a relatively long length of life of the synchronization installation is achieved thereby. Additionally, a ring shape, readily controllable from a manufacturing point of view results therefrom which permits an isometric construction of the conical circumferential surfaces. Advantageously the synchronizing ring in accordance with the present invention is so constructed that the synchronizing ring is stressed cylindrically in the working position thereof, especially at the blocking point of the synchronization installation whereas in the end position of the shifting sleeve as well as in the centering position thereof, the synchronizing ring has a non-circular shape. Such measure offers the additional advantage that by deferring all other factors, the synchronizing ring may be constructed in an optimum manner exclusively with a view toward the synchronizing work.

The synchronizing ring according to the present invention is preferably bent from a rod-shaped form part into an open ring which consists of individual ring sectors of differing radii producing approximately identical radial stresses. A synchronizing ring constructed in this manner excels by a relatively high strength and capability of resistance in the circumferential direction. The manufacture of the synchronizing ring in accordance with the present invention, however, is also feasible by plastic deformation, preferably cold deformation of a cylindrical ring while reducing the original diameter therof which is pressed in this manner into a contour shape necessary for the stress production or stress generation. Furthermore, it is possible, if it so appears desirable, to manufacture the synchronizing ring by machining in closed base shape and thereafter to cut the ring open.

Accordingly, it is an object of the present invention to provide a synchronizing installation for change-speed transmissions, especially for motor vehicles, of the type having a slotted and springy ring which obviates the aforementioned shortcomings and disadvantages encountered with the prior art constructions.

It is another object of the present invention to provide a synchronizing ring for synchronization installations of the type described hereinabove in which the pressure forces, at least during the synchronization operation, are approximately the same over the entire circumference thereof so as to assure an even wear of the friction surfaces.

Still another object of the present invention resides in the provision of a slotted synchronizing ring in which an even pressure distribution is assured without involving complicated manufacturing steps or costly manufacturing techniques.

Still another object of the present invention resides in the provision of a synchronization installation provided with slotted synchronizing rings in which the wear of the friction surfaces of the synchronizing rings is equalized to such an extent that the synchronizing rings need to be exchanged only after substantial and even wear has occurred over the entire circumference thereof.

Still a further object of the present invention resides in the provision of a synchronizing ring for a synchronization installation of change-speed transmissions which has approximately the same cross section over the entire circumference thereof yet is subjected during the synchronizing phase to approximately the same forces over the entire circumference thereof.

Another object of the present invention resides in the provision of a synchronization installation for change-speed transmissions, especially of motor vehicles having synchronizing rings of the type mentioned hereinabove which permit a reduction in the shifting forces necessary to produce engagement of a speed while at the same time increasing the length of life of the synchronization arrangement.

A still further object of the present invention resides in the provision of a synchronizing ring of the type mentioned hereinabove which may be designed for optimum conditions, offers great strength and high resistance capability in the circumferential direction, may be readily manufactured, and may be used with any one of numerous differing types of synchronization installations.

These and other objects, features and advantages of the present invention will become more obvious from the following description when taken in connection with the accompanying drawing which shows for purposes of illustration only, two embodiments in accordance with the present invention, and wherein, FIGURE 1 is an axial longitudinal cross sectional view through a part of a synchronization installation of a change-speed transmission provided with a synchronizing ring in accordance with the present invention, shown in the working position thereof, FIGURE 2 is a cross sectional view, on a reduced scale, taken along line II—II of FIGURE 1.

Figure 8:
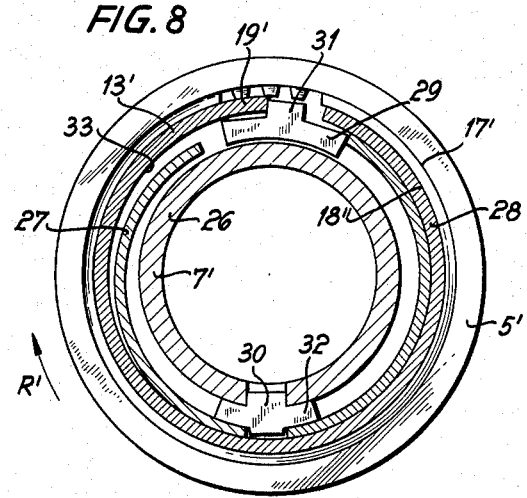

FIGURE 3 is an elevational view of the unstressed synchronizing ring of FIGURE 2 in accordance with the present invention, FIGURE 4 is a partial cross sectional view, similar to FIGURE 1, of the synchronization installation with the synchronizing ring thereof retained within the coupling body, under initial or prestress, FIGURE 5 is a partial cross sectional view of the synchronization installation, similar to FIGURE 4 with the synchronizing ring thereof in the working position, FIGURE 6 is a partial cross sectional view of the synchronization installation according to FIGURE 4 with the parts thereof illustrated after completion of the change in speed or transmission ratio, FIGURE 7 is an axial longitudinal cross sectional view through a part of a modified embodiment of a change-speed transmission having a shifting sleeve and provided with a synchronizing ring in accordance with the present invention which is under the effect of blocking means increasing the servo-effect thereof, and FIGURE 8 is a cross sectional view, on a reduced scale, of the synchronization installation of FIGURE 7, taken along VIII—VIII of FIGURE 7, and showing the parts thereof in the working position.

Referring now to the drawing wherein like reference numerals are used throughout the various views to designate like parts, and more particularly to FIGURES 1 and 2, reference numeral 1 designates therein the driven or output shaft of a change-speed transmission for motor vehicles. The gear wheels 2 and 3 are rotatably connected with the output shaft 1, that is are able to rotate relative to the output shaft 1, but are so mounted that they cannot move longitudinally with respect to the output shaft 1. The gear wheels 2 and 3 are in constant meshing engagement with gear wheels (not shown) mounted on a drive shaft (not shown) as is conventional. A sleeve carrier 4 is splined to the driven shaft 1. A shifting sleeve 5 is retained longitudinally displaceable on the sleeve carrier 4. Coupling bodies 6 and 7 are operatively connected with the gear wheels 2 and 3, respectively, for rotation in unison therewith. The gear teeth 8 and 9 of the coupling bodies 6 and 7, respectively, come into engagement, at the end of the shifting operation, with the shifting teeth 10 of the shifting sleeve 5. Slotted and springy synchronizing rings 13 are arranged on the hub portions 11 and 12 of the coupling bodies 6 and 7, respectively. The synchronizing rings 13 are secured in the axial direction by snap rings or locking rings 14. A rotation of the synchronizing rings 13 in the circumferential direction is prevented by the abutment 15 inserted into the hub portions 11 and 12. The teeth 8 and 9 of the coupling bodies 6 and 7 are provided with centering surfaces 16 (FIGURE 5) and the teeth 10 of the shifting sleeve 5 are provided with inclined working surfaces 17. The synchronizing ring 13 is provided with roof-shaped friction surfaces 18 and 18' extending along the circumference thereof of which the friction surface 18 is coordinated to the working surface 17 and the friction surface 18' to the centering surface 16.

In the unstressed condition (FIGURE 3) the synchronizing ring 13 having the same cross section over the entire circumference thereof is of oval shape with the largest diameter $a'$ in an axial plane $x$—$x$ which extends perpendicularly to the axial plane $y$—$y$ of the ends of the ring 19 in such a manner that the conical friction surface 18 coincides during the synchronization work over the entire circumference with the conical working surface 17 of the shifting sleeve 5. As a result of such a design in its shape the area of the ring ends 19 as well as the part of the ring circumference opposite thereto comes to lie at a distance indicated by the dimension $b$ inside the circumference $a$. The thus deformed ring is made of a cold-drawn sectional wire in a bending installation, is subjected to an eventually necessary heat treatment or annealing operation, and is subsequently calibrated in a device for accuracy as regards the ring sectors producing the radial stress. Thereafter there may be additionally applied an abrasion-resistant wear-layer, for example, molybdenum to the friction surface of the synchronizing ring, for instance, by means of flame-spraying.

During assembly (FIGURE 4) of the synchronization installation the unstressed synchronizing ring 13 of which the diameter $a'$ is larger than the diameter of the centering surface 16 is inserted into this surface under compression in the plane $x$—$x$ and is pre-stressed as a result thereof. The amount of initial or pre-stress is so selected that the synchronizing ring 13 initially maintains its oval shape under slight elongation.

If the shifting sleeve 5 is now, as shown in FIGURES 1 and 2, displaced from the neutral position thereof toward the left as viewed in the drawing for purposes of synchronization, then the working surface 17 comes into force-locking connection with the friction surface 18 whereby the synchronizing ring 13 is taken along in the circumferential direction R (FIG. 2) until the end 19 of the ring 13 abuts against the abutment 15. The synchronizing ring 13 thereby exerts a force against the abutment 15 under the influence of which the abutment force resulting from the static inherent stress is increased in the radial direction by the amount of the servo-effect thereof. As a result of applying further pressure to the shifting sleeve 5 in the shifting direction, the working surface 17 thereof comes into abutment over its entire width against the friction surface 18 of the synchronizing ring 13. When this position, namely the working position of the synchronizing ring 13 is attained (FIG. 5), then the synchronizing ring 13 assumes, as a result of the compressing action to which it is subjected, the desired cylindrical outer form so that the conical friction surface 18 thereof abuts against the working surface 17 of the shifting sleeve 5, also of conical shape, over the entire circumference.

When synchronism is achieved in this manner, the shifting sleeve 5 may be displaced over the synchronizing ring 13 and may be brought into meshing engagement with the teeth 8 of the coupling body 6 whereby the change-speed operation, that is, the change in transmission ratio is completed. In the thus resulting end position (FIGURE 6) of the shifting sleeve 5 the synchronizing ring 13 is further compressed by a predetermined amount so that the circumference of the roof crest or apex 20 comes to lie in a wedge-shaped aperture 21 (FIG. 5) of the shifting sleeve 5. The end position of the shifting sleeve 5 is secured by reason of the increased radial stress exerted in several places of the circumference of the now again oval synchronizing ring 13.

As a result of this operation of the synchronizing ring 13 it is prevented with certainty that especially at the ends of the ring 13 the entire friction layer is worn off whereas no significant wear occurs over the remainder of the circumference. A premature scraping of the synchronizing installation as a result of uneven wear of the synchronizing rings is therewith avoided in an effective manner.

FIGURES 7 and 8 illustrate a synchronizing installation having essentially the same basic construction as that of the preceding embodiment whereby, however, the synchronizing rings, in order to achieve a shorter shifting time, are subjected additionally to the influence of blocking means increasing the servo-effect thereof. The same parts are again designated in FIGURES 7 and 8 with the same though primed reference numerals.

The gear wheels 2' and 3', rotatably connected with the driven or output shaft 1' are again provided with coupling bodies 6' and 7' between which is arranged a sleeve carrier 4'. A shifting sleeve 5' is longitudinally displaceably retained on the sleeve carrier 4'. The coupling bodies 6' and 7' possess shifting teeth 8' and 9', respectively, with which are adapted to be coupled the teeth 10' of the shifting sleeve 5'. Slotted and springy synchronizing rings 13' are arranged on the hub portions 25 and 26 of the coupling bodies 6' and 7' which synchronizing rings 13' are secured in the axial direction by snap rings or locking rings 14'. Between the hub portions 25 and 26 of the coupling bodies 6' and 7' and the synchronizing rings 13' are inserted springy tensioning bands or blocking elements 27 and 28 (FIGURE 8) which are supported against abutments 29 and 30. The abutment 29 is displaceably supported and extends with the nose portion 31 thereof between the two ring ends 19' whereas the abutment 30 is arranged securely within the hub portion 25 or 26 and is provided with tongue portions 32 for the guidance of the blocking bands 27 and 28.

The synchronizing ring 13' utilized in this synchronization installation is constructed of oval shape in the unstressed condition thereof corresponding to that of the first embodiment according to FIGURE 3 whereby, however, in the lay-out of the ring sectors of different curvatures additionally the factors resulting from the blocking means 27–30 as regards the radial stressing thereof exerted at the circumference during the synchronization operation have to be taken into consideration in connection with the design of their shape. The design of the shape of the synchronizing ring is, therefore, dependent on the measurable magnitude of the blocking means which engage along the inner circumference 33 of the synchronizing rings as well as on the extent of the inherent or residual stress as a result of the compressing action in the working position at the blocking point, that is, in the position in which it is impossible or nearly impossible to the person undertaking the shifting operation to carry out the shifting operation prior to reaching synchronism.

The manufacture of the synchronizing ring of this embodiment may take place in accordance with the teachings of the previously described embodiment of FIGURES 1–6 as well as also by cold-deformation of a cylindrical ring under reduction of the original diameter into a contour form necessary for producing the stresses. Additionally, it is possible to manufacture the synchronizing ring by turning or cutting in closed non-circular shape and to cut open after final treatment thereof.

During shifting of a speed or transmission ratio, the working surface 17' of the shifting sleeve 5' is brought into frictional engagement with the friction surface 18" of the synchronizing ring 13' held under pre-stress within the centering surface 16'. As a result thereof, the synchronizing ring 13' is taken along in the circumferential direction R' by the shifting sleeve 5' until the ring end 19 abuts against the nose portion 31 of the abutment 29. The synchronizing ring 13', also of oval shape at first in this position, now seeks in its turn to rotate the blocking band 28 by way of the abutment 29 (FIGURE 8) which, however, is prevented by the stationary abutment 30. The force exerted at the shifting sleeve 5' thus results in a pre-stressing of the blocking band 28 and presses thereby against the internal surface of the synchronizing ring 13' which results in an increase of the servo-effect thereof. Simultaneously therewith the synchronizing ring 13' is subjected to an enlarging action into the cylindrical outer contour so that at the blocking point the conical friction surface 18" thereof abuts over the entire circumference at the conical working surface 17' of the shifting sleeve 5'.

In this embodiment, by reason of the blocking means, higher pressure forces are effective at the leading side of the synchronizing ring than at the trailing side since the blocking band 27 remains thereat without effect between the hub portion of the coupling body and the synchronizing ring. This circumstance, however, does not lead to a one-sided wear of the friction surface of the synchronizing ring because, as proved by experience, an even alternate-load distribution is to be noted between shifting up and shifting down operations of the various speeds so that alternately the one or other blocking band becomes effective. As a result thereof the differing loads at the circumference of the synchronizing ring are equalized so that nonetheless an even wear of the friction surfaces of the synchronizing ring is realized.

After the completed speed-change, that is, when the shifting sleeve 5' has been displaced over the synchronizing ring 13' and is in form-locking engagement with the coupling body, the further compressed synchronizing ring 13' secures the end position of the shifting sleeve 5' as in the first embodiment in that the circumference of the roof apex engages in the wedge shaped aperture 21' of the shifting sleeve 5'.

While I have shown and described two embodiments in accordance with the present invention, it is understood that the same is not limited thereto but is susceptible of numerous changes and modifications within the scope of a person skilled in the art. For example, the present invention is not limited to the two illustrated embodiments of change-speed transmissions but may be used with any type of change-speed transmission, in which, inter alia, for instance, the coupling bodies adapted to be connected with the structural part to be shifted are made in one piece with the respective gear wheels. Additionally, the manufacture of the unstressed synchronizing ring may be realized in any other suitable manner, for example, by cutting the synchronizing rings of the full material by means of a copying template. Furthermore, the synchronizing ring, insofar as necessary, may also ultimately be placed in a device for the final machining thereof in which the ring is held in the working position thereof and is provided with the friction surface extending thereat in the desired concentic relationship to the working surface of the shifting sleeve. In case of extreme loads, as occur, for example, in change-speed transmissions for trucks having large masses to be brought into synchronism, it may be advantageous under certain circumstances for achieving an even wear to deform ovally the synchronizing rings having the same diameter and additionally to provide the same at the place of the largest bending moments with a larger wall thickness than over the remainder of the circumference. It is thereby prevented that the synchronizing rings are excessively deformed or have to be selected excessively strong over the entire cross section thereof.

Thus, while I have shown and described herein only two embodiments, it is obvious that the present invention is not limited thereto but is susceptible of numerous changes and modifications within the spirit and scope as known to a person skilled in the art, and I therefore do not wish to be limited to the details shown and described herein but intend to cover all such changes and modifications as are encompassed by the scope of the appended claims.

I claim:

1. A synchronization installation for change-speed transmissions, especially for motor vehicles, comprising:
   shifting sleeve means having working surface means,
   coupling body means adapted to be coupled for rotation in unison with said shifting sleeve means,
   and synchronization means for effecting synchronism between said shifting sleeve means and said coupling body means during engagement of a speed in the change-speed transmission including slotted springy synchronizing ring means retained under initial stress in said coupling body means and having at least one friction surface adapted to engage with said working surface means and at least one centering surface adapted to engage with said coupling body means,
   said synchronizing ring means being of substantially the same cross section over the entire circumference thereof and being of oval shape in the unstressed condition thereof with the largest dimension extending in an axial plane which is disposed substantially perpendicularly to an axial plane between the ends of the synchronizing ring means, so that the synchronizing ring means assumes a substantially cylindrical shape during synchronization operation of the installation.

2. In a synchronization installation for change-speed transmisions, especially for motor vehicles in which a synchronizing body consists essentially of a slotted springy ring which is retained under pre-stress in a coupling body adapted to be coupled to a shifting sleeve and possesses at least one friction surface which, when brought into engagement with the working surfaces provided on the shifting sleeve, effects synchronism,
   the improvement essentially consisting of a structure constituting said slotted springy synchronizing ring of substantially the same cross section over the entire circumference which, in the unstressed condition thereof, is of substantially oval shape having the largest dimension in an axial plane extending approximately perpendicularly to the axial plane passing between the ends of the ring so that the synchronizing ring assumes a substantially cylindrical shape during synchronizing operation of the installation when brought into engagement with the working surfaces.

3. In a synchronization installation for change-speed transmission, especially for motor vehicles, in which a synchronizing body consists essentially of a slotted springy synchronizing ring which is retained under pre-stress in a coupling body adapted to be coupled to a shifting sleeve by engagement with a centering surface thereof and possesses at least one friction surface which, when brought into engagement with working surfaces provided on the shifting sleeve effects synchronism to enable displacement of the shifting sleeve into the end position thereof,
   the improvement essentially consisting of a structure consituting said slotted springy synchronizing ring of substantially the same cross section over the entire circumference which, in the unstressed condition thereof, is of substantially oval shape having the largest dimension in an axial plane extending approximately perpendicularly to the axial plane passing between the ends of the ring, said synchronizing ring being thereby stressed substantially into the cylindrical shape thereof during the synchronization operation upon engagement with the working surfaces of the shifting sleeve while in the working position and being of non-circular shape with the shifting sleeve in the neutral as well as in the fully engaged position thereof.

4. A springy, slotted synchronization ring with two ends for change-speed transmissions, especially for motor vehicles, said ring being of substantially the same cross section over the entire circumference thereof and essentially consisting of a plurality ring sectors having different radii of curvature, and which, in the unstressed condition thereof is of substantially non-circular shape with the largest dimension thereof in a plane which is disposed approximately perpendicularly to a diametric plane extending between the ends of the synchronizing ring.

5. A springy slotted synchronization ring having two ends for change-speed transmissions, especially for motor vehicles, said ring being of substantially the same cross section over the entire circumference thereof and essentially consisting of a plurality of ring sectors having different radii of curvature, and when, in the unstressed condition thereof is of substantially non-circular shape with the largest dimension thereof in a plane which is disposed approximately perpendicularly to a diametric plane extending between the ends of the synchronizing rings, the ends of said ring as well as the circumferential portion thereof opposite said ends being normally spaced predetermined dimensions from and on the inside of a circle with a diameter corresponding said largest dimension.

6. A synchronization installation for change-speed transmissions, especially for motor vehicles, comprising:
   shifting sleeve means having working surface means,
   coupling body means having centering surface means,
   and synchronization means for effecting synchronism between said shifting sleeve means and said coupling body means including slotted spring synchronizing ring means retained under initial stress in said coupling body means by the centering surface means and having at least one friction surface,
   said synchronizing ring means being of substantially the same cross section over the entire circumference thereof and being of oval shape in the unstressed condition thereof with the largest dimension extending in an axial plane which is disposed substantially perpendicularly to an axial plane between the ends of the synchronizing ring means so that the synchronizing ring means assumes a substantially cylindrical shape during synchronization operation of the installation.

7. In a synchronization installation for change-speed transmissions, especially for motor vehicles, in which a synchronizing body consists essentially of a slotted springy ring which is retained under pre-stress in a coupling body adapted to be coupled to a shifting sleeve having end and centering positions by engagement with a centering surface thereof and possesses a least one friction surface which, brought into engagement with working surfaces provided on the shifting sleeve effects synchronism to enable the displacement of the shifting sleeve into the end position thereof, the improvement essentially consisting of a structure constituting said slotted springy synchronizing ring which, in the unstressed condition thereof, is of substantially oval shape having the largest dimension in an axial plane extending approximately perpendicularly to the axial plane passing between the ends of the ring so that said synchronizing ring is stressed into the substantially cylindrical shape during synchronization operation by engagement with said working surfaces while in the working position thereof corresponding to the blocking point of the synchronization installation and is of non-circular shape with the shifting sleeve in the neutral and fully engaged position thereof, said synchronizing ring being substantially cylindrically stressed by engagement with said shifting sleeve in the working position thereof corresponding to the blocking point of the synchronization installation and being of non-circular shape in the end position of the shifting sleeve as well as in the centering position thereof.

References Cited by the Examiner
UNITED STATES PATENTS

| | | | |
|---|---|---|---|
| 1,927,641 | 9/33 | Griffith | 74—339 X |
| 2,771,975 | 11/56 | Schmid. | |
| 2,932,373 | 4/60 | Schmid. | |
| 3,152,676 | 10/64 | Mandlinger et al. | |

DAVID J. WILLIAMOWSKY, *Primary Examiner.*

BROUGHTON G. DURHAM, *Examiner.*